Oct. 27, 1953     K. A. BEVINGTON     2,656,961
ICE-CREAM BAR BAGGING MACHINE

Filed Aug. 17, 1948     10 Sheets—Sheet 1

Inventor:
Kenneth A. Bevington
By Bair & Freeman
attys

Oct. 27, 1953

K. A. BEVINGTON

2,656,961

ICE-CREAM BAR BAGGING MACHINE

Filed Aug. 17, 1948

Inventor:
Kenneth A. Bevington.
By Bair & Freeman
attys

Oct. 27, 1953     K. A. BEVINGTON     2,656,961
ICE-CREAM BAR BAGGING MACHINE
Filed Aug. 17, 1948     10 Sheets-Sheet 6

Inventor:
Kenneth A. Bevington
By Bair & Freeman
attys

Oct. 27, 1953 K. A. BEVINGTON 2,656,961
ICE-CREAM BAR BAGGING MACHINE
Filed Aug. 17, 1948 10 Sheets-Sheet 7

Inventor:
Kenneth A. Bevington.
By Bair & Freeman
attys

Fig. 18.

Patented Oct. 27, 1953

2,656,961

UNITED STATES PATENT OFFICE 2,656,961

ICE-CREAM BAR BAGGING MACHINE

Kenneth A. Bevington, Evanston, Ill.

Application August 17, 1948, Serial No. 44,675

22 Claims. (Cl. 226—2)

This invention relates to a machine for bagging ice cream bars and other articles of a similar nature, such as confectionery bars An object of the invention is the provision of a machine for bagging articles including novel means for supporting a quantity of bags in which individual bags are arranged for successively receiving the articles.

Bags such as used for bagging ice cream bars, are usually in flat condition, and they must be opened out for receiving the articles.

Another object is the provision of novel means for retaining and opening out the bags.

Still another object is the provision of a novel arrangement whereby a continuous air blast is employed for opening out the bags.

A further object is the provision of a bagging machine having a novel feed hopper for the articles.

The feed hopper is movable to a loading position and to a position where continued movement feeds the articles into the bags. A still further object of the invention is the provision of novel means for quickly moving the feed hopper from loading position to a discharging position, and thereafter slowly moving the hopper for successively feeding the articles into the bags.

Another object is the provision of a bagging machine wherein the articles fall into the bags by gravity, and gravity then carries the bagged articles out of the bagging zone and into position for collecting.

A further object is the provision of a machine of a novel construction which can be easily disassembled for purposes of cleaning.

Still another object is the provision of a bagging machine having a novel movable feed hopper having a slidable bottom panel, the panel in one position of the feed hopper being in position for closing the hopper, and in another position of the hopper being in position for providing an opening in the bottom of the feed hopper.

Another object is the provision of a bagging machine which can be disassembled and which includes as a sub-assembly thereof, the feed hopper and bottom panel just referred to and a carriage for supporting the hopper and panel.

A further object is the provision of a novel conveyor for carrying the bagged articles out of the bagging zone.

Still another object is the provision of a conveyor which can be disassembled and which includes a removable plate immediately under the upper run of the conveyor for retaining the upper run flat.

With these and other objects in view, my invention consists in the arrangement and combination of the various parts of my bagging machine whereby the objects contemplated are attained, as hereinafter more fully set forth, pointed out in my claims and illustrated in the accompanying drawings, wherein:

Figures 1, 19:
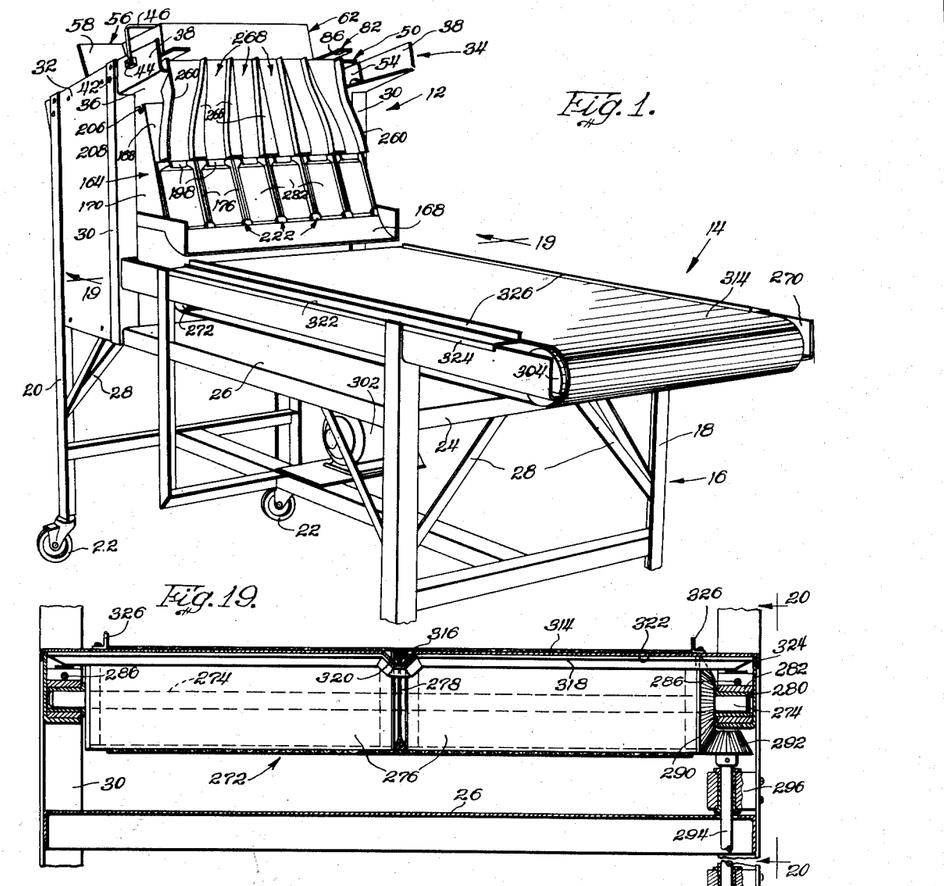
Figure 1 is a perspective view of the machine of the present invention illustrating the bagging machine proper in the background and a conveyor in the foreground.
Figure 19 is an enlarged sectional view of a portion of the conveyor taken on line 19—19 of Figure 1.

Referring in detail to the drawings, Figure 1 illustrates the bagging machine of the present invention in perspective view. The bagging machine proper is indicated at 12 and the numeral 14 refers to the conveyor for carrying the bagged articles to a collection point. For purposes of convenience to the reader, the side of the machine of Figure 1 facing the observer will be referred to as the front and the other side, or hidden side, will be referred to as the rear.

Figure 4:
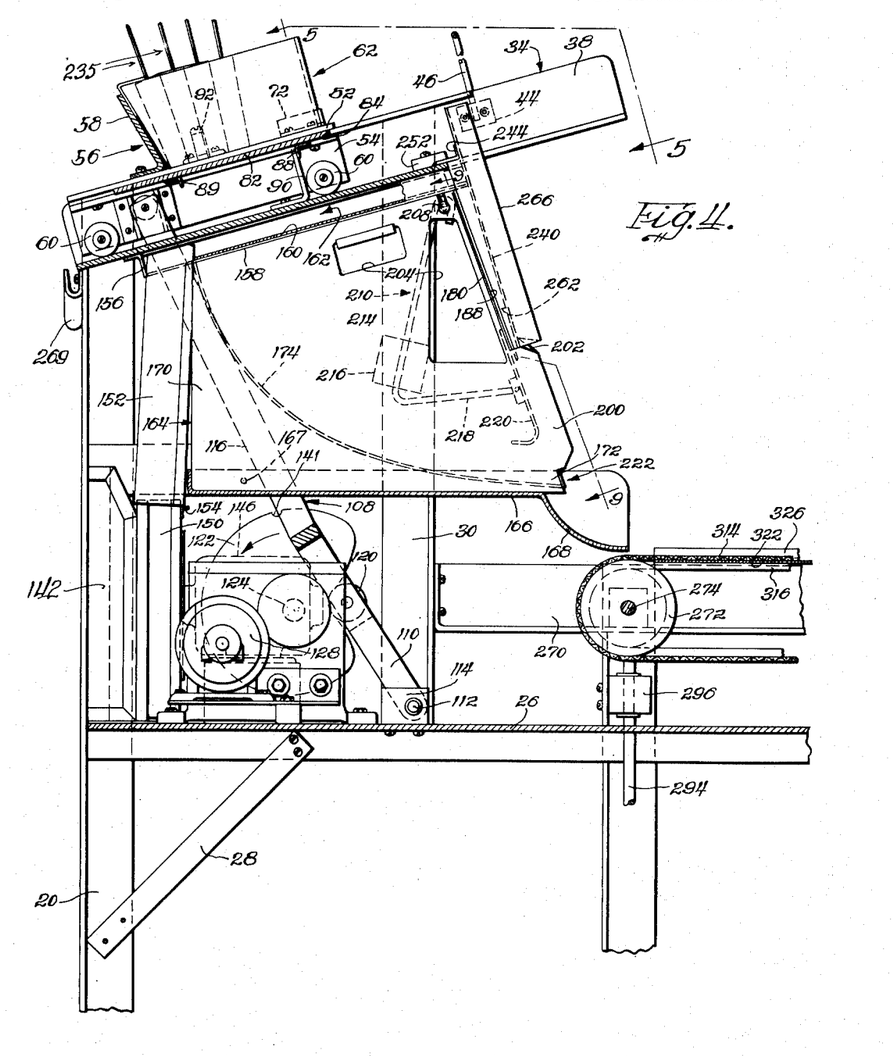
Figure 4 is a sectional view taken substantially on the line 4—4 of Figure 3 and showing a portion of the conveyor.

The machine includes a framework 16 which includes legs 18 under the conveyor and legs 20 at the rear of the machine. The legs 18 and 20 may be provided with casters 22 if desired for ease in moving the machine about. Connecting the legs 18 and 20 are vertical flanges of a plate or deck 26, which extends from the front of the machine to the rear, and as illustrated in Figure 4 is utilized for supporting certain elements of the machine.

Other reinforcing diagonal pieces 28 are provided at various points for imparting rigidity to the framework. The legs 20 extend upward to a point above the conveyor. Upright members 30 are positioned forwardly of and extend to a greater height than the rear legs 20. Side panels 32 are secured between the members 30 and legs 20 on the sides and rear to enclose those sides of the bagging machine.

Figure 18:
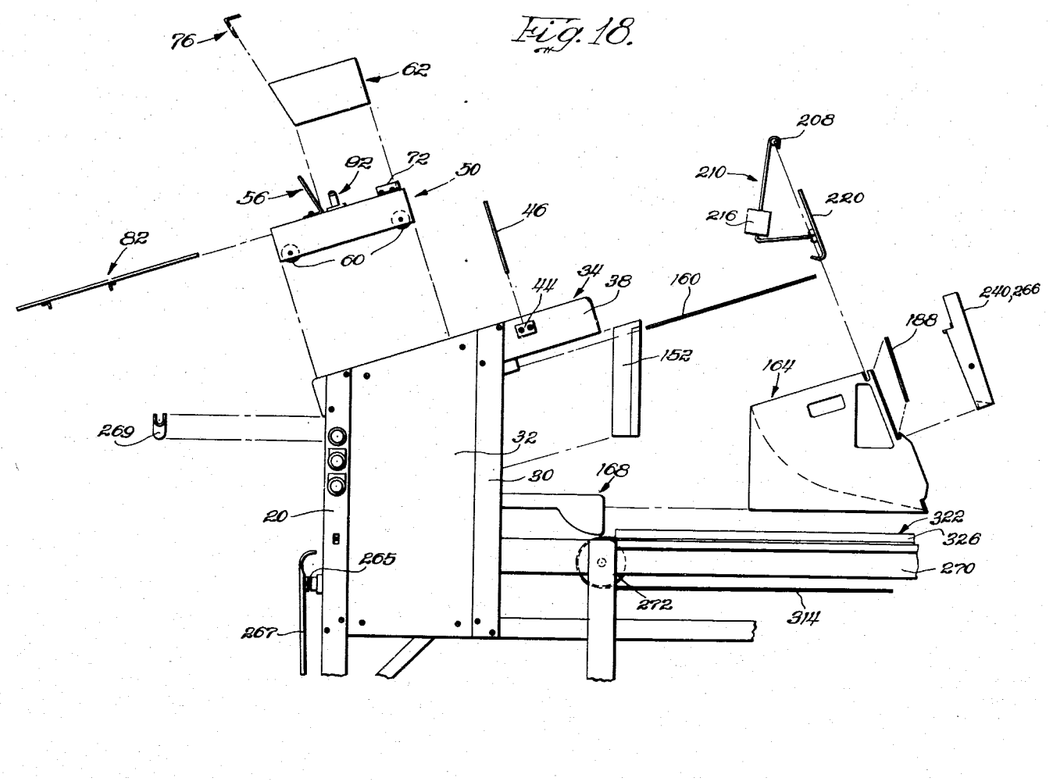
Figure 18 is an exploded view of the different parts of the bagging machine.
Figure 20:
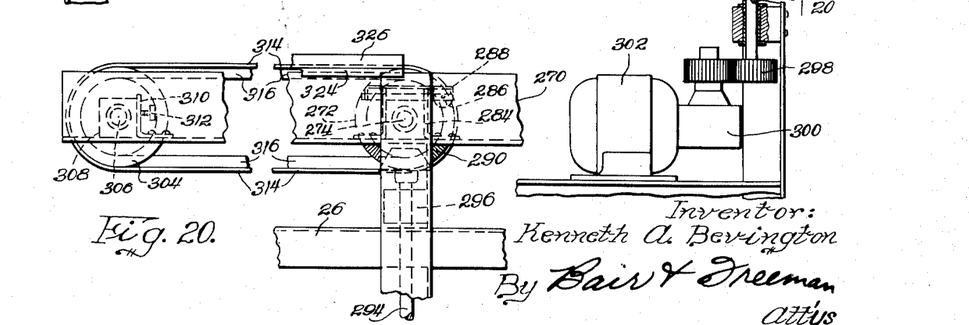
Figure 20 is a view taken on line 20—20 of Figure 19.
Figure 21:
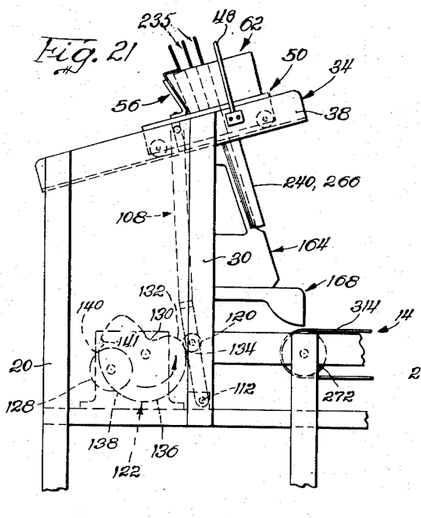
Figures 21 to 24 are side views of the bagging machine, in different stages of operation.
Figure 22:
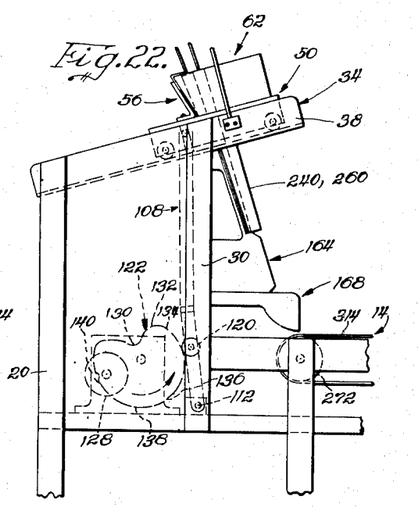
Figure 23:
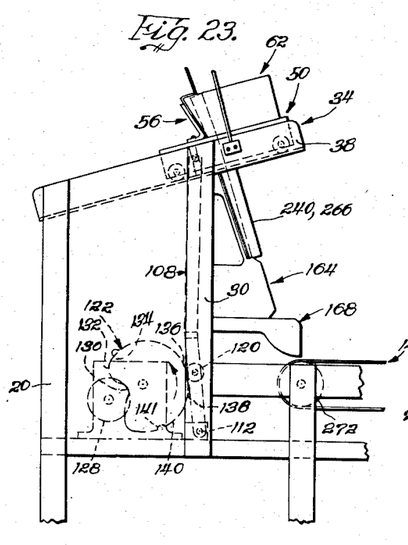
Figure 24:
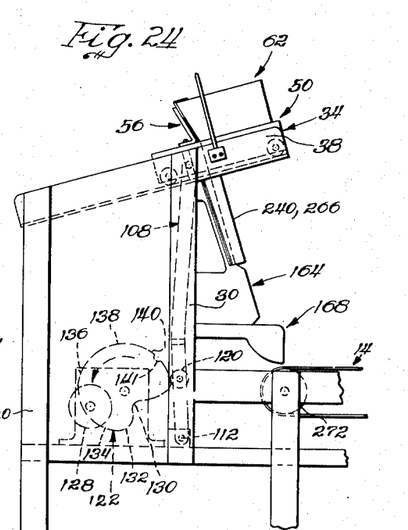

Figure 18 will be referred to throughout the specification, for the purpose of pointing out the general appearance and the identity of the various parts so that the reader will gain an immediate general impression of the machine.

Figure 18 also is for the purpose of illustrating the manner in which the various parts of the machine can be easily dismounted and substantially the whole machine disassembled.

A top plate 34 is mounted on the members 30 and 20, and due to the difference in height between the members 30 and legs 20, the front of the plate 34 is inclined upwardly. Reference is made to Figures 1 to 5 for the details of the top plate 34. The plate 34 has a main flat portion 36 with upturned vertical flanges 38.

The forward edge of the plate is cut back to form arms 40 extending forwardly beyond the forward edge of the bagging machine. The upper ends of the members 30 and legs 20 are cut back to form notches in which the plate 34 rests, the latter being secured in place by means of bolts 42. The forward edge of the main portion 36 of the plate is disposed substantially at the forward side of the bagging machine proper, for a purpose which will appear later.

Secured to the outer sides of the flanges 38 adjacent the forward edge of the machine are bosses 44 in which are formed holes for the reception of a bail member or guide 46. The bail member 46 extends upwardly and has a horizontally extending element 48.

The plate 34 forms a track or runway for a feed hopper and carriage therefor. The carriage is indicated as a whole at 50 (Figure 18), and reference is directed to Figures 2, 4, and 5, for the details thereof. The carriage 50 includes a pair of laterally spaced plates 52 each having a downturned flange 54. The plates 52 are interconnected by a cross piece 56 in the form of an angle member having an upturned leg 58 which is inclined rearwardly. The plates 52 extend longitudinally with respect to the front-rear direction of the machine and are so spaced that the downturned flanges 54 substantially abut the inner surfaces of the flanges 38 on the top plate 34. The flanges 54 are provided with rollers 60 at front and rear by which the carriage bears on the top plate 34 and the carriage is slidable forwardly and rearwardly on the top plate.

A feed hopper is indicated in its entirety at 62 and is made up of a front plate 64, a rear plate 66 and end plates 68. The rear plate 66 is inclined rearwardly to conform to the inclination of the member 58. The feed hopper 62 is provided with a plurality of laterally spaced partitions 70. The feed hopper 62 has an open bottom to be opened and closed by means to be described presently.

The transverse length of the feed hopper 62 is such that its ends rest on the inner marginal edges of the plates 52 of the carriage. The feed hopper is restrained against movement laterally by brackets 72 and against movement forwardly by hooks 74 formed on the forward ends of the brackets 72 and turned over the front side of the feed hopper. The fed hopper is restrained against rearward movement on the carriage by the cross member 56.

Figure 8:
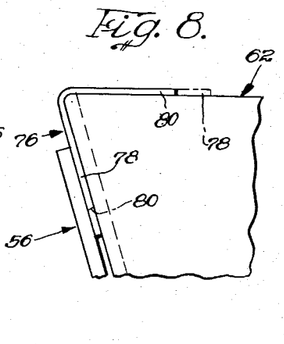
Figure 8 is an enlarged detail view taken on line 8—8 of Figure 2.

An angle strip 76 is secured to the rear upper edge of the feed hopper 62, and includes a long leg 78 and a short leg 80. The strip 76 is secured as illustrated in Figure 8 with its short leg secured to the rear side of the hopper, and the long leg extending horizontally across the top of the hopper. The strip is detachably secured in such a position that it can be removed and turned over for disposing either leg alternately over the top of the hopper.

The feed hopper 62 is closed by a bottom panel 82 in the form of a plate. The bottom panel 82 is secured to the under surface of the plate 52 of the carriage by means of cleats 84 which are secured to the plates 52 by means of screws with filler pieces interposed between the cleats and plates 52. Extending forwardly and formed as a part of the bottom panel 82 are arms 86 which in the rear position of the bottom panel (Figure 2) extend beyond the front edge of the top plate 34.

Secured on the under surface of the bottom panel 82 are longitudinally spaced stop members 88 and 89. Another stop member 90 is secured to the top plate 34 and extends upwardly into position for engagement by the stops 88 and 89.

Figure 2:
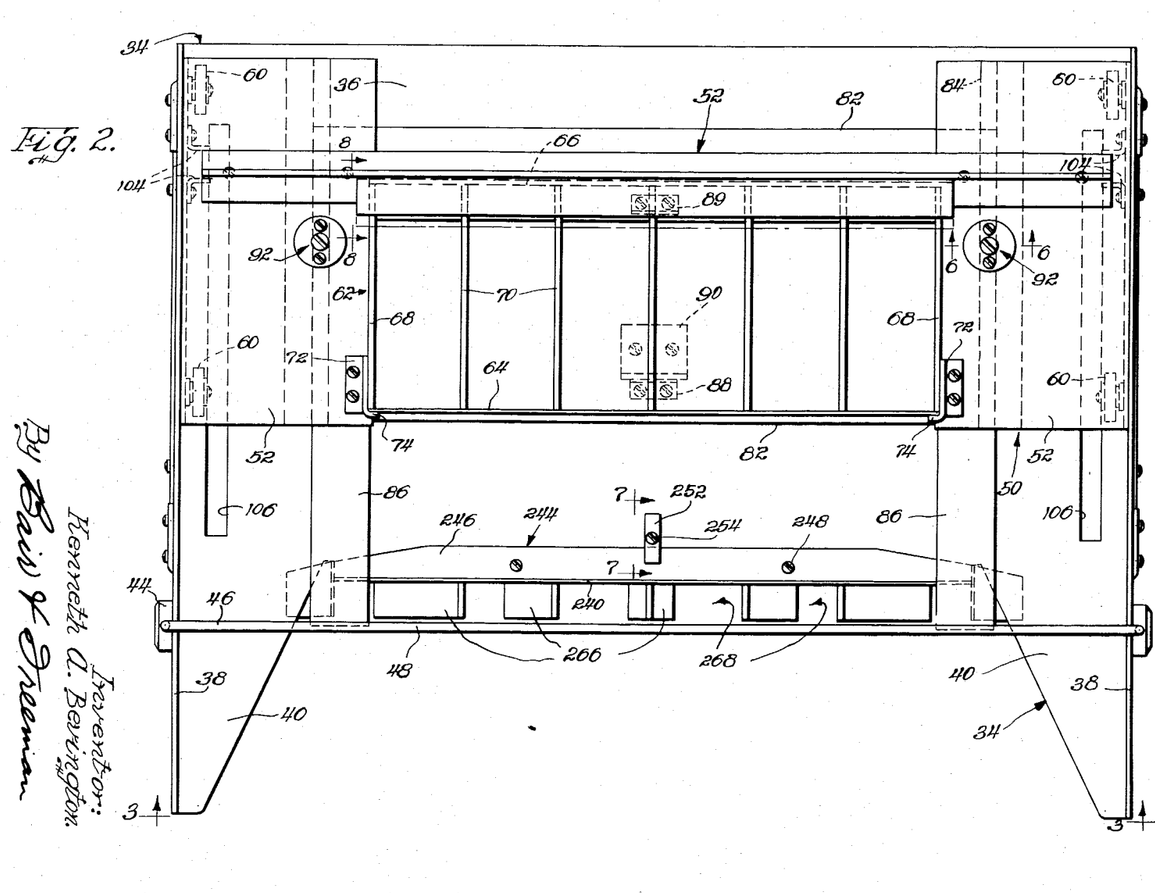
Figure 2 is a plan view on an enlarged scale of the bagging machine proper, with the conveyor omitted.
Figure 5:
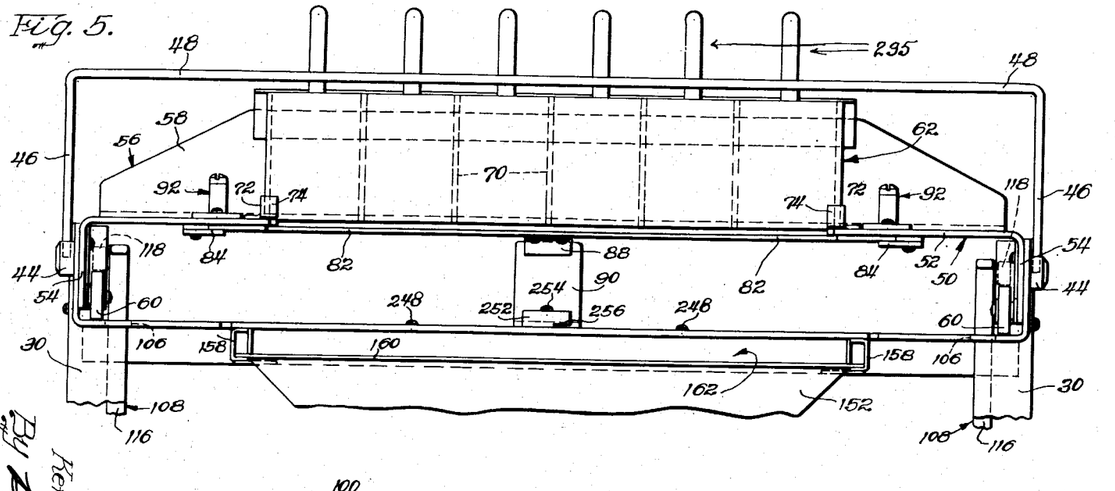
Figure 5 is a view taken on staggered line 5—5 of Figure 4.
Figure 6:
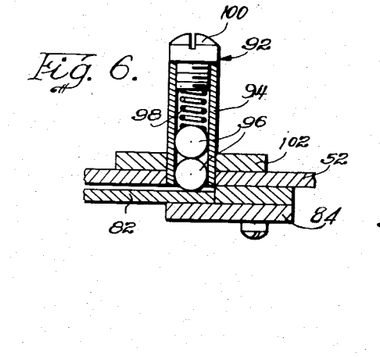
Figure 6 is a detail sectional view taken on line 6—6 of Figure 2.
Figure 7:
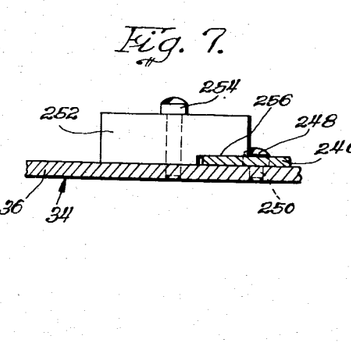
Figure 7 is an enlarged view taken on line 7—7 of Figure 2.

The bottom panel when in the position shown in Figures 2 and 4 serves to close the bottom of the feed hopper 62 and moves with the carriage 50 under certain conditions. For causing movement of the bottom panel 82 with the carriage 50, a friction element 92 is provided. One friction element 92 is provided adjacent each end of the bottom panel as illustrated in Figures 2 and 5. The details of construction of the member 92 are shown in Figure 6. The friction device 92 includes a tubular member 94 having a reduced lower end, and containing bearing balls 96. A compression spring 98 is disposed above the balls 96, and retained in place by a cap screw 100. The tubular member 94 is provided with an anchoring plate 102. The lower end of the tubular member 94 is inserted in an opening in the plate 52 and secured in place by means of screws threaded in the plate 102 and the plate 52. The lower end of the tubular member is then in such a position that the lower bearing ball 96 engages the bottom panel 82. When the carriage is moved along the runway in the bottom plate 34, the bottom panel 82 is carried along with the carriage until an outside force prevents its continued movement. The stop 90 is engaged by one or the other of the stops 88 and 89.

On the inner surface of each down turned flange 54 of the carriage 50 and toward the rear thereof is a pair of vertical angle members 104. The angle members of each pair form a vertical extending channel. Formed in the top plate 34 are slots 106 extending longitudinally of the latter, one slot being positioned adjacent the lateral extremities of the top plate. A lever arm 108 (Figures 3 and 4) is employed for actuating the carriage 50. The lever arm 108 includes a lower portion 110 pivoted at 112 on a pin supported in bosses 114 mounted on the deck 26 at a point adjacent the center of the machine. The lever arm 108 includes branches 116 extending laterally to the sides of the machine and then upwardly through the slots 106. At the upper end of each branch 116 is a roller 118, being received in the channel formed by the vertical angle pieces 104.

Adjacent the lower edge of the lever arm 108 is a roller 120 which engages a cam 122. The cam 122 is mounted on a shaft 124 forming a part of a gear reducer 126. The gear reducer is driven by an electric motor 128.

The cam 122 is of a special construction designed for the purpose of producing variable speed movement of the lever 108 and the carriage 50. The cam includes a depression 130 adjacent which is a surface 132 for rapid throw action of the cam. The remaining surface of the cam comprises what will be termed for convenience first, second, third and fourth discharging positions, indicated by the reference numerals 134, 136, 138, and 140, respectively. The positions 134 to 140 are disposed progressively farther from the axis of the cam and the fourth position 140 includes a segment which is substantially truly radial. The cam 122 rotates counter-clockwise as viewed at Figures 21 to 24. In the fourth position 140 is a notch 141 in the cam, for the purpose of slightly jarring the lever arm 108 and consequently the feed hopper 62.

The back of the machine is provided with an opening in which is inserted an air filter 142. The filter 142 covers the inlet of a blower 144 which may be conventional and which is driven with a motor 146 supported on a support 148 which is mounted on the deck 26. The main air inlet of the blower 144 is adjustable to vary the amount of air taken in and delivered, and thereby vary the air blast or current for use in opening the bags as will be described later. The outlet 150 of the blower leads upwardly where it is connected with an upwardly diverging duct 152. The lower end of the duct 152 is fitted over the upper end of the outlet 150 of the blower and retained in place by any convenient means, such as an angle bracket 154 secured to the outlet of the blower.

The duct 152 (Figures 3, 4, and 5) leads upward to the top plate 34. An angle strip 156 extends transversely across the lower portion of the top plate 34 and serves as a stop means for the upper end of the duct 152.

Adjacent each end of the angle piece 156 is a channel 158. The channels 158 extend forwardly of the top plate 34 and are disposed with their open sides facing each other. A plate 160 is fitted on the lower flanges of the channels 158 and seated against the front surface of the upper end of the duct 152 and extends forwardly and terminates at the forward end of the channels, both of which terminate adjacent the forward side of the bagging machine proper. The plate 160 and channels 158 constitute a top air duct 162. The top has an opening communicating with the top duct 162. The top duct 162 finally communicates with a delivery duct which is formed in a portion of the machine yet to be described.

A magazine is indicated in its entirety by the numeral 164 (Figure 18), the details of construction of which are best illustrated in Figures 3, 4, 9, and 10. The magazine 164 is removably supported on a deck 166 (Figure 4) which is pivotally supported at 167 by the side members of the machine and has at its forward edge a shield or deflector plate 168 which curves downwardly and forwardly.

The front edge of the deck 166 can be swung upwardly, when the magazine is removed, to afford access to the space below from the front.

The magazine 164 includes side plates 170 defining the extremities of the magazine. The lower edges of the side plates 170 are preferably straight so as to rest on the deck 166, and the forward edges thereof, as indicated at 172, extend out into the vertical projection of the shield 168.

A bottom plate 174 is secured between the side plates 170. The bottom plate curves rearwardly and upwardly and terminates adjacent the upward rear edge of the magazine. The shape of the bottom plate 174 need not be truly arcuate, and in fact the lower front portion approaches a straight-line shape. The magazine, of course, is of appropriate height to fit under the top duct 162. Reinforcing pieces may be provided at the rear of the side plates 170 if desired. A plurality of partitions 176 are formed in the magazine parallel with the side plates, forming compartments 178. The top portion of the front of the magazine 164 is closed by means of a plate 180 secured to the side plates and to the partitions. The plate 180 is provided with an upwardly curved cut out portion 182 in register with each compartment 178. Thus the front of the magazine is open at its lower portion forming an opening with respect to each individual compartment. The front edges of the side plates 170 have flanges 184 at the upper portions turned over the front side of the plate 180. The flanges 184 are provided with cut back portions in the lower ends forming shoulders 186.

Figure 9:
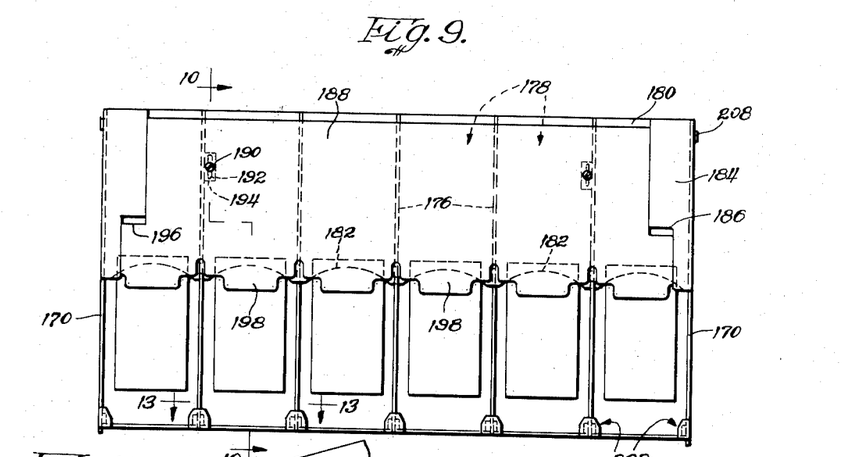
Figure 9 is a view taken on staggered line 9—9 of Figure 4.
Figures 10, 13:
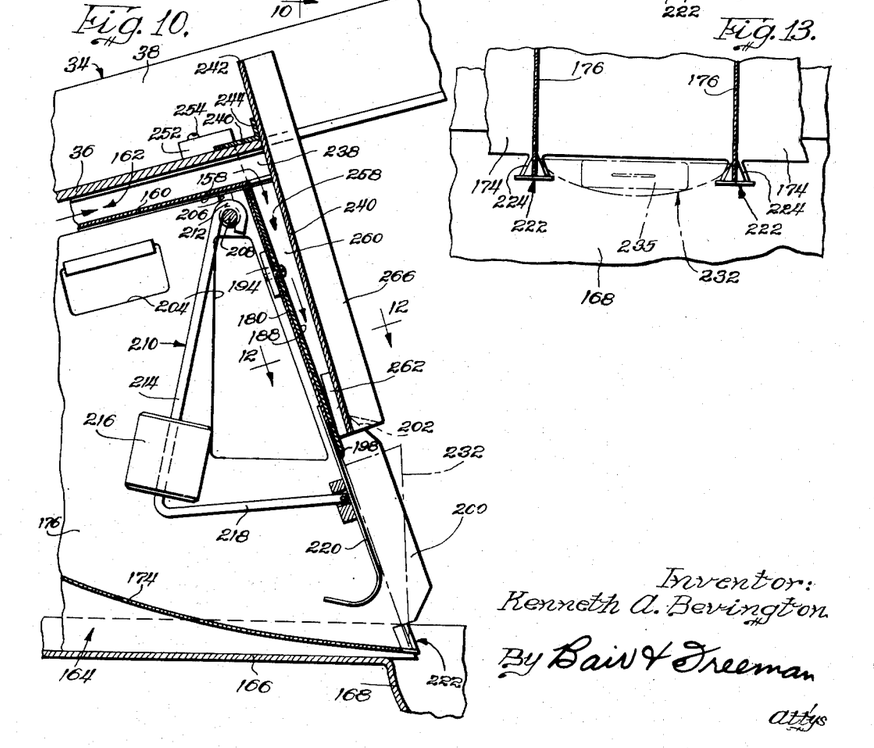
Figure 10 is an enlarged sectional view taken on line 10—10 of Figure 9.
Figure 13 is an enlarged view taken on line 13—13 of Figure 10.

Mounted on the outer surface of the plate 180 is an adjustable cover plate 188. The cover plate 188 is provided with screws 190 which are inserted through slots 192 in the plate 180 (Figures 9 and 10). Brackets 194 receive the screws 190 and bear on the inner surface of the front plate 180. Thus by loosening the screws 190 the cover plate 188 can be adjusted vertically with respect to the plate 180 and retained in adjusted position by tightening the screws. The lateral extremities of the plate 188 are guided between the flanges 184. The lower portion of the plate 188 is provided with extensions forming shoulders 196 which engage the shoulders 186 on upward movement of the plate 188 and limit the movement of the latter.

The lower edge of the cover plate 188 is provided with a series of downwardly extending projections 198 in register with the individual compartments 178 and extending into the openings of the latter.

The lower front edges of the partitions 176 extend outwardly beyond the plates 180 and 188 as indicated at 200. The upper edge of each extension of 200 is shaped to have a hook 202.

The side walls 170 of the magazine and the partitions 176 may be provided with openings such as 204 for handling the magazine and for affording access to the interior.

The side walls 170 and partiaions 176 are provided with aligned notches 206 in the upper edge adjacent the front of the magazine. In the notches 206 is a shaft 208 extending transversely across the magazine. A pusher member is indicated at 210 and includes a hook portion 212 which is detachably hooked over the shaft 208. There is one such pusher 210 in each of the compartments 178. Leading downwardly from the hook 212 is a straight portion 214 on which is supported a weight element 216, and extending toward the front is a bottom element 218 on the front edge of which is pivotally mounted a pusher plate 220. Each pusher 210 is adapted to swing in the respective compartment following the curvature of the bottom 174. The plate 220 is so positioned on the pusher that the upper end of the plate engages the lower edge of the front plate 180. The bottom of the pusher plate 220 terminates above the bottom edge of the opening in the front of the magazine.

The numeral 222 refers to a holding clip secured to the bottom of the front edge of each partition 176; similar half-clips are secured to each side plate 170. In this particular, reference is directed to Figures 9, 13, 14, 15 and 16. The front edge of the bottom 174 of the magazine in the case of each partition 176 is notched to provide a flared extension 224 terminating flush with the outer edge of the partition. A clip plate 226, inclined rearwardly, is disposed transversely across the front edge of the partition and secured, as by soldering, to the partition and front edge of the flared portion 224. The clip plate is wider than the front terminal edge of the flared portion 224.

A filler piece 228 is inserted in the lower corner defined by the clip plate 226 and the partition. One filler piece is inserted on each side of the respective partition. The filler pieces are wedge shaped to correspond to the flared extensions 224 so as to provide an inclined face to be engaged by a lower marginal edge of a bag 232 and the inclined faces of the wedges tend to constrict the opening to center the bag in the compartment. This arrangement serves to compensate for slight variations in the width of bags employed. The lower edge of each filler piece terminates short of the lateral extremities of the clip plate leaving a small space as indicated at 230. In addition, shelves or ledges 231 are formed on the flared extensions 224 by the greater width of the flared extensions than the filler pieces. I have found that best results are obtained when the shelves are approximately .025" in width. In the case of each partition 176, the clip plate 226 extends across the edge of the partition and forms a projection in front of each of the adjacent compartments, but in the case of the side walls 170 only one-half of the holding clip is employed; in this case it extends inwardly from the respective side plate, in front of the opening of the compartment.

Figure 17:
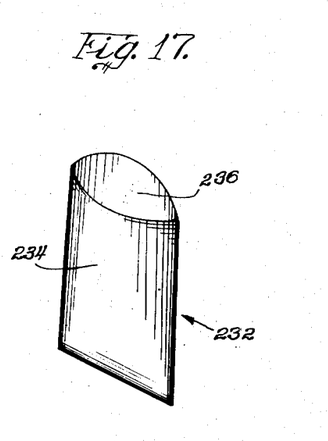
Figure 17 is an illustration of the type of bag to be used in the machine of the present invention.

Figure 17 illustrates a conventional bag employed for bagging the articles. The bag as a whole is indicated at 232 and, as is well known, is in the form of a flat bag having a front top portion 234 and a flap or lip 236.

Figure 11:
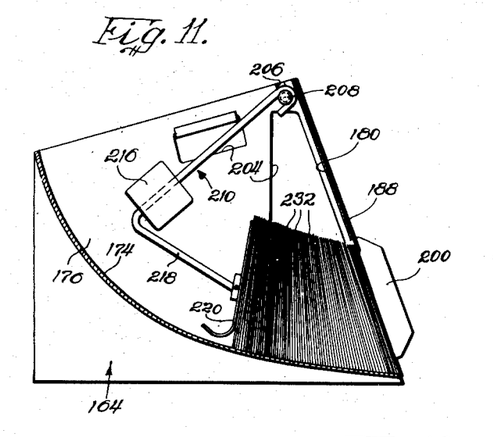
Figure 11 is a diagrammatic view similar to Figure 10 illustrating the bag follower in an alternate position.

Figure 11 illustrates diagrammatically a pack of bags in the magazine. A plurality of bags 232 are stacked in flat condition ahead of the pusher plate 220 in each compartment.

Figure 10 illustrates one such bag 232 in dot-dash outline and in open position. The bags are inserted with their open ends up and with their front upper edges disposed outwardly. The lower corners of the front bag engage the holding clips 222 and rest upon the ledges 231 formed by the flared extensions 224, adjacent the wedges 228, and the flap 236 at the top engages the projections 198 with the front top portion terminating below the projections. The pusher 210 can be swung rearwardly and upwardly in the respective compartment so that a large number of bags can be accommodated. The vertical adjustment of the cover plate 188 permits accommodation of bags of different lengths within a limited range. The marginal edges of each clip plate 226 are beveled on the rear surface to permit the bags to slide thereover, having no sharp or rough edges which might tear to restrict the movement of the bags.

As mentioned above, the channels 158 and plate 160 terminate substantially at the front of the bagging machine. From Figure 10, it will be noted that there is a slight difference in length of these elements. The plate 160 terminates adjacent the plate 188 and the channels 158 extend forwardly a slight distance thereof as indicated at 238. It will also be noted that the channels terminate flush with the front edge of the main portion 36 of the top plate 34. An outer plate 240 is spaced outwardly of the plate 188. The outer plate 240 abuts against the front edge of the top plate 34, extending above the plate 34 as indicated at 242. A transversely extending angle piece 244 is secured to the rear surface of the front plate 240. The angle piece 244 includes a leg 246, which is supported on the top surface of the plate 34. The plate 34 is provided with threaded openings 250 into which are threaded studs 248 with the heads of the studs seated in openings in the leg 246. A bracket 252 is pivoted by means of a screw 254 in the top plate 34 adjacent the leg 246. The bracket 252 includes an extension 256 adapted to overlie the leg 246 when the bracket is pivoted in that direction. Thus the bracket 252 secures the outer plate 240 against displacement forwardly by the studs 248, and upwardly by the extension 256.

Figure 3:
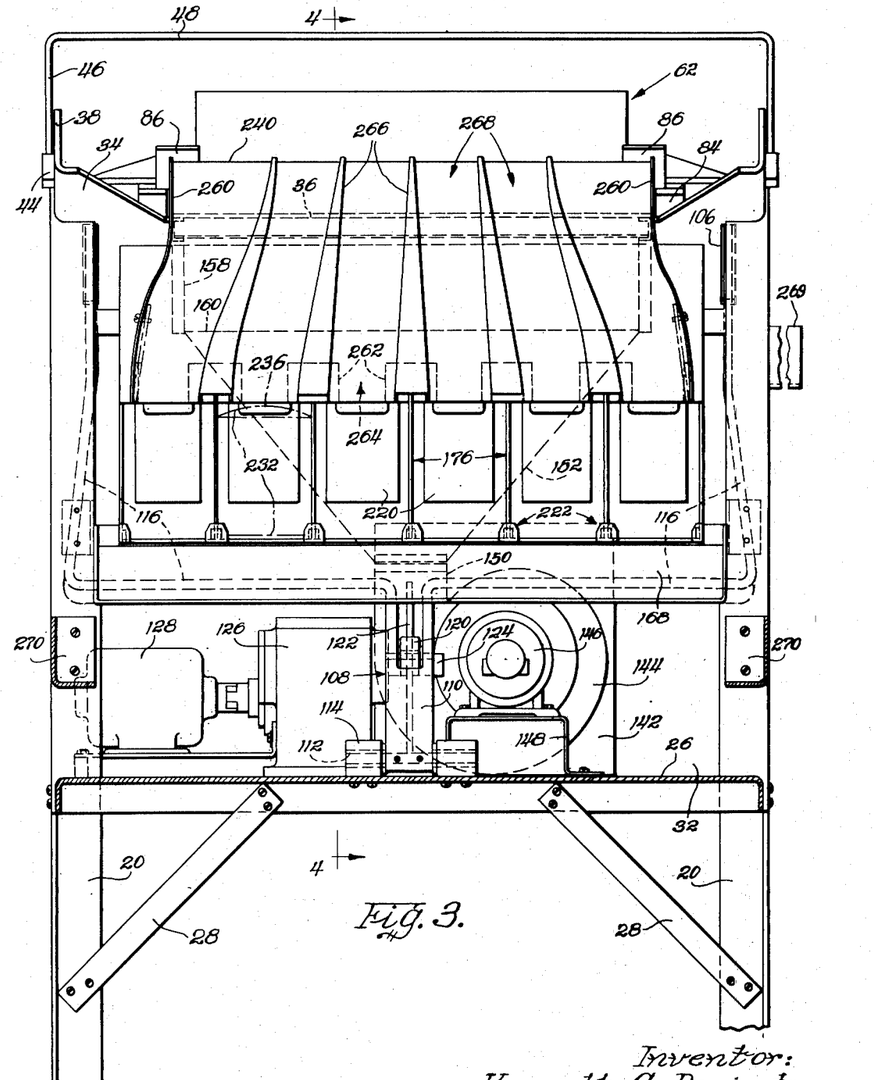
Figure 3 is a front elevational view of the bagging machine proper, taken on line 3—3 of Figure 2.
Figure 12:
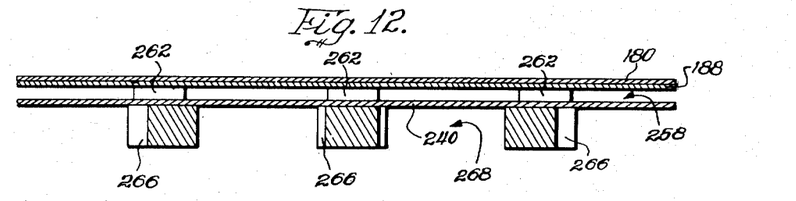
Figure 12 is a sectional view taken on line 12—12 of Figure 10.
Figures 14, 15, 16:
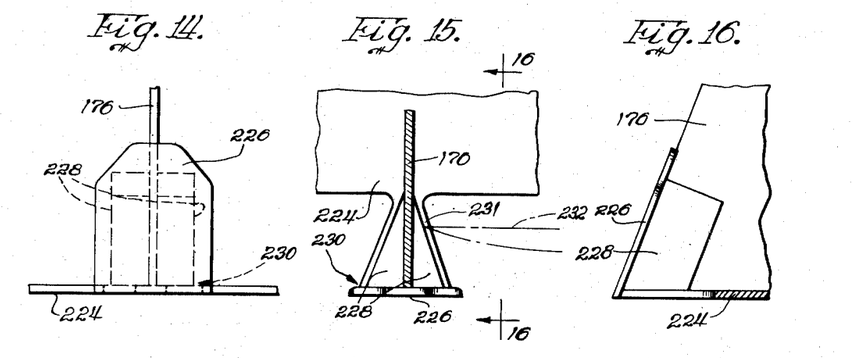
Figure 14 is an enlarged front elevational view of one of the holding clips at the bottom of the partition walls of the bag magazine.
Figure 15 is a top view of Figure 14.
Figure 16 is a view taken on line 16—16 of Figure 15.

The lower edge of the outer plate 240, in assembling the device, is inserted in the hooks 202 formed on the extensions 200 on the partitions. The outer plate 240 then forms a delivery duct 258. Since the plate 160 terminates flush with the cover plate 188, the delivery duct 258 communicates with the top duct 162. The sides of the delivery ducts 258 are closed by the side flanges 260 secured on the edges of the outer plate 240. Adjacent the bottom of the delivery duct 258 are a plurality of blocks 262 (Figures 3, 10, and 12). The blocks 262 are aligned with the partitions in the magazine forming individual channels in register with the respective compartments. The lower channels of the delivery duct 258 thus terminate immediately above the openings in the lower part of the front wall of the magazine. The blocks 262 bear on the plate 188 thus spacing the lower end of the plate 240 therefrom and the lower edge of the plate 240 is effectively locked between the plate 188 of the hook members 202.

Secured to the front surface of the outer wall 240 are a plurality of wedge shape members 266 forming a plurality of chutes 268 therebetween.

The flanges 269 on the lateral extremities of the outer plate 240 are extended forward and define the outer edges of the outer chutes. The upper ends of the chutes 268 are in register longitudinally with the compartments in the feed hopper 62. The wedge shape members 266 taper downwardly and diverge downwardly so that the chutes are roughly of uniform transverse dimension, and the bottom ends of the chutes are substantially in register with the compartments 178 in the magazine. The front of the chutes remains open.

The upper ends of the chutes 268 are disposed so that the feed hopper 62 is over the chutes at certain positions of the feed hopper, as will be explained fully in connection with the operation of the machine.

Attention is directed to the fact that the front wall of the magazine approaches the vertical although it is inclined therefrom to some extent. The main consideration is that the articles to be bagged slide down the chutes 268 and although the front of the magazine and the chutes may be disposed at different angles, the angle employed must be sufficient for the articles to slide rapidly down the chutes.

The conveyor which is indicated in its entirety at 14, includes a pair of laterally spaced angle members 270. A roller 272 is mounted on the members 270 adjacent the front end under the shield 168. The roller 272 includes a shaft 274 and two cylindrical rollers 276 connected to and disposed on opposite sides of a pulley element 278. The outer ends of shaft 274 are provided with bearings including sleeves 280 mounted in rectangle bearing blocks 282. Each bearing block 282 is supported in a bearing mounting including a pair of angle brackets 284 mounted on the respective members 270. The brackets 284 are spaced apart to receive the bearing block and are provided with aligned holes for the receipt of a lock pin 286. The pin 286 is provided with a clip 288 which is positioned over the top of the bracket 284 and secured onto the pin similarly to a safety pin.

Secured to the shaft 274 at one end of the roller is a bevel gear 290 which meshes with another gear 292. The gear 292 is mounted on a vertical shaft 294 in bearing supports 296. The shaft 296 has driving connection through gearing 298 with a speed reducer 300 and an electric motor 302.

The conveyor includes a second roller 304 having a shaft 306 provided with bearing blocks 308. A single angle bracket 310 is mounted on each side member 270 and is provided with a set screw 312. The roller 304 is disposed on the side of the bracket 310 remote from the other roller and the set screw 312 engages the bearing block and thereby the roller 304 can be adjusted toward and away from the roller 272. The construction of the roller 304 is the same as the roller 272 which includes the V-shaped pulley element.

An endless belt 314 is trained over the rollers 272 and 304 and includes an upper run and a lower run. On the inner surface of the runs of the belt is a guiding element 316 in the nature of a strip of V belting and extends longitudinally along the linear dimension of the runs of the belt. The guiding element 316 is received in the V-shaped pulley elements of the rollers and by this feature the belt is restrained against displacement axially of the rollers.

A plurality of cross braces 318 extend transversely of the conveyor frame and are attached to a supporting plate 322 which has down turned flanges 324, which engage the side members 270. The supporting plate 322 is formed with a longitudinally extending central depression 320 for accommodating the guiding element 316. Angle strips 326 are secured to the upper surface of the plates 322 adjacent the lateral edges of the belt. The position of the supporting plate 322 is thus immediately under the upper run of the belt whereby it forms a support for the upper run of the belt. It will be noted from Figures 1 and 4 that the front end of the conveyor is disposed under the shield or deflector plate 168. Access to the roller 272 is afforded upon the front edge of the deck 166 being swung upwardly.

A trough or gutter 269 (Figure 4) is secured to the back plate of the machine adjacent the rear edge of the top plate 34. The gutter 269 slopes toward one side of the machine, and is so positioned that any liquid flowing from the top plate 34 drops thereinto and is carried off into a receptacle.

A lever 267 is pivoted on the rear of the machine adjacent the bottom and extends upwardly so that the upper portion of the lever can be engaged by the knee. The lever 267 is provided with an actuating plug 265 for operating the control switch for the motor 128 for driving the cam 122. The circuit for controlling the motor 128 may be arranged for cyclic operation so that when the operator actuates the switch the motor revolves the cam one full revolution and then stops; or it may be arranged for continuous operation of the motor.

Figure 13 shows a bag 232 opened out with an ice cream bar 235 therein. The ice cream bar, as usual, is provided with a stick. Figures 21 to 30 also show the ice cream bars in place in the feed hopper.

*Use and operation*

Figure 25:
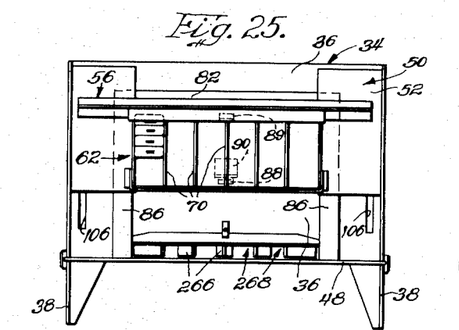
Figures 25 to 30 are plan views of the bagging machine proper in different stages of operation.

The machine as illustrated in Figures 4 and 25 shows the parts at the beginning of a cycle of operation. In this position, the cam 122 is turned so that the roller 120 on the lever arm 108 falls into the depression in the cam. The carriage 50 and the feed hopper 62 are disposed in loading position, to which they normally move by gravity. The feed hopper 62 is provided with laterally spaced compartments to accommodate existing machines used for forming the ice cream bars. Such a machine includes a multiple arrangement for holding the ice cream sticks, i. e., six groups of four each. The bars are molded onto the sticks and then dipped, and the bars thus coated are inserted in the feed hopper. The hopper has six compartments, and each compartment contains four bars, as illustrated in the drawings. The particular number of bars accommodated, however, does not form an essential of the invention.

The ice cream bars are usually wedge shape, and the horizontal leg of the angle strip 76 engages the sticks of the bars and holds them in upright position, to insure against coatings of the bars contacting the rear wall of the hopper and interfering with free discharge of the bars.

After the feed hopper is loaded, the operator presses the lever 267 and the switch controlled thereby starts the cycle of operation. The cam 122 then rotates so that the cam surface 132 quickly throws the lever 108 clockwise. The upper ends of the branches of the lever arm 108 engage the carriage 50 and move the carriage upwardly and forwardly in the runway in the top plate 34. The friction device 92 acting on the bottom panel 82 initially carries the bottom panel with the carriage; when the stop 89 on the bottom panel encounters the stop member 90, the bottom panel is restrained against further movement. When this occurs, the front edge of the bottom panel is disposed substantially in register with the chutes 268. At the point where the bottom panel is checked in movement, the front edge of the feed hopper is still positioned over the bottom panel.

Continued movement of the cam acting through the lever arm moves the carriage 50 forward in the runway. The feed hopper then slides over the bottom panel and moves the ice cream bars forward so that they drop out of the feed hopper over the front edge of the bottom panel. One ice cream bar in each compartment thus drops out and slides down the respective chute 268.

During this operation the blower 144 is operating and causing a continuous blast of air to be driven up the outlet duct 152 which continues through the top duct 162. The blast of air then continues down the front delivery duct 258 and out the lower extremities thereof. The blast of air emerging from the delivery duct 258 blows into the front bags held below the duct. It will be recalled that the bags are held in place by the projections 198 engaging the flaps or lips 236 at the top, and by the lower corners abutting the holding clips 222. The blast of air emerging from the delivery duct blows into the bags and opens out the front wall thereof. The ice cream bars drop from the chutes into the bags, and in dropping from the height of the chutes, said bars gain considerable momentum and when they fall into the bags, the bags are released from the holding clips 222. As mentioned above, the air blast in the ducts can be regulated in intensity by regulating the inlet of the blower. Thus means is provided for accommodating bags of different sizes and paper characteristics to insure that the bags will be fully opened.

When the lower corners of the bag are released from the holding clips, the momentum of the ice cream bar pulls the bag from between the pusher plate 220 and the projection 198. The bag with the ice cream bar therein then slides over the shield 168 and onto the conveyor. The conveyor carries the bagged article away from the bagging zone to a collection point.

Figure 28:
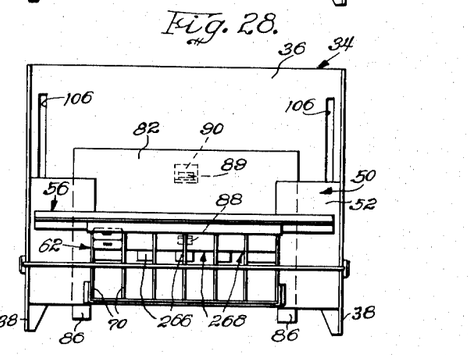
Figure 29:
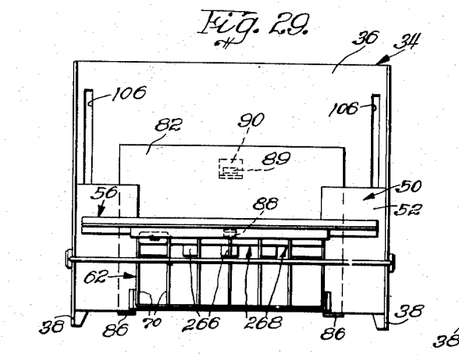
Figure 30:
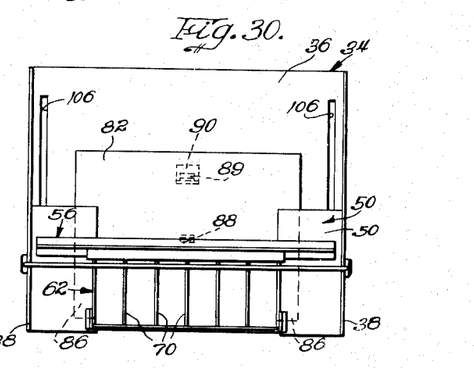

Continued movement of the carriage and feed hopper to the position of Figure 28 permits the second series of ice cream bars to drop out and down the chutes. The time required for the ice cream bars to fall down the chutes and out onto the conveyor is very short, and consequently the feed hopper can be moved from the position of Figure 27 to the position of Figure 28 within a short interval of time.

Figure 26:
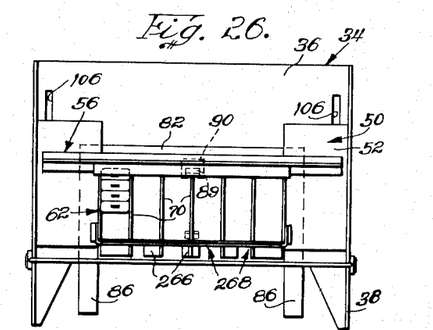
Figure 27:
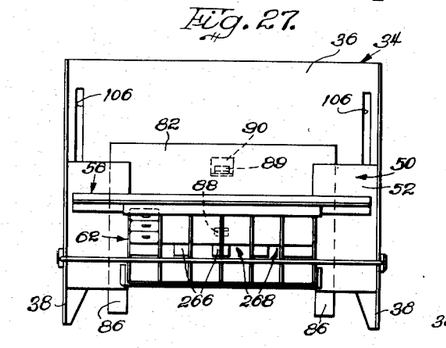

Figure 25 illustrates the carrier and feed hopper at its rearward position. Figure 26 shows the feed hopper approaching discharging position which is at the front edge of the runway. Figures 27 to 30 show successive stages for discharging successive series of ice cream bars.

Figures 21 to 24 illustrate clearly the various positions of the feed hopper in the different stages of discharging and in these figures are also shown the positions of the cam 122. The throw of the cam at the surface 132 is much greater than that between successive points 134 to 140. It will be noted from the above that the feed hopper is moved from its loading position at the rear of the machine to a position just short of the discharging position in a very short interval of time, and from the latter position to the discharging position it is moved at a slow rate. When the feed hopper reaches the fourth discharging position, the notch 141 jars the lever arm 108, and thereby the feed hopper and insures that the bars in the last series are jarred loose from the feed hopper, if they should happen to adhere thereto, and be properly discharged.

The cross bar 46 is disposed a short distance above the upper surface of the feed hopper so that if any of the ice cream bars fall over forward, they will be straightened up on contact with the bar 46, so as to maintain the bars in a proper aligned position for discharging through the chute 268.

The arms 86 on the bottom panel 82 provide a means whereby the bottom panel is supported in the carriage after the carriage moves past the front edge of the bottom panel proper.

I call particular attention to the novel construction of the holding clips 222, including the shelves or ledges 231 of the flared portions 224, for supporting the lower corners of the bags. The lower corners of the bags rest on the shelves, and the foremost bag bears against the clip plates 226 in the spaces 230. As each bag is removed, the remaining bags remain securely in position on the shelves or ledges and are forced forwardly by the pusher plate 220.

Sanitation is of primary importance in handling ice cream and other confections. In this machine all of the parts of the machine that come in contact with the ice cream are made of stainless steel so that the ice cream is not tainted and so that the parts of the machine can be easily cleaned. To carry out the latter feature, special attention is directed to the novel construction of various parts whereby all of the essential parts can be quickly disassembled from the machine for repair, replacement and cleansing.

Figure 18 illustrated diagrammatically the parts which can be removed from the frame. The detail description in connection with each of the individual parts can be referred to for the construction by reason of which they are removable.

Figure 18 is effective for summarizing the demountable features of the parts. The outer plate 240 can be removed from the machine and all surfaces thereof cleaned. When this is done, the magazine 164 can be removed bodily. The pushers 210 and the supporting pin 208 can be removed by lifting them out of the magazine. The plate 188 can be removed from the plate 180. All of the surfaces of the magazine are then accessible for cleaning. The plate 160 is removed merely by sliding it out of the channel members 158. The blower duct 152 is removable by merely drawing forward on its upper end and lifting it off of the blower. The angle strip 76 is readily demountable from the feed hopper 62. The feed hopper is removable from the carriage 50 merely by lifting it off. The bottom panel 82 is removed by sliding it out of the rear of the carriage. The carriage is removed by lifting it out of the runway in the top plate 34.

In the case of the conveyor 14 the supporting plate 322 is removed merely by raising it upwardly to clear the side members 270 and sliding it laterally outwardly. The rollers in the conveyor can readily be removed.

Thus the bagging machine of the present invention is readily susceptible to being entirely disassembled.

While I have shown a particular embodiment of my invention, it will be understood, of course, that I do not wish to be limited thereto since many modifications may be made, and I, therefore, contemplate by the claims appended hereto to cover any such modifications or substitutions of equivalents as fall within the true spirit and scope of my invention.

I claim:

1. In a bagging machine, a generally closed frame, a feed hopper mounted on the upper part of the frame and movable to a loading position, and to a discharging position at one side of the frame, a plate pivoted in the frame below said feed hopper with its swinging edge disposed adjacent the side of the frame below said discharging position, said plate being normally horizontal and swingable upwardly, a magazine removably mounted on said plate, a conveyor having one end disposed under the swinging edge of said plate, said plate being adapted to deflect articles descending from said feed hopper in discharging position onto said conveyor, operating means mounted in said frame below said plate and exposed to the exterior when said plate is pivoted upwardly, means operably interconnecting said operating means and said feed hopper, said operating means being effective for moving said feed hopper from loading position to discharging position, and means for operating said conveyor.

2. In a bagging machine, the combination comprising, a frame, a feed hopper slidably mounted on said frame, a bottom panel in said hopper, said panel being slidable with respect to said frame and said hopper, friction means intercooperating between said hopper and panel operable to slide said panel in response to sliding of said hopper, means limiting the sliding movement of said panel to a range less than the range of sliding movement of said hopper, and a chute leading from within the range of movement of said hopper to a bagging zone.

3. In a bagging machine, the combination comprising, a frame, a feed hopper slidably mounted on the frame and movable to a loading position and to a discharging position, said hopper having an open bottom closed by a bottom panel slidably mounted with respect to said hopper and to the frame, said panel being movable to a position for closing said hopper when the latter is in its loading position, means limiting the movement of said panel so that when said hopper is in its discharging position its bottom is at least partially open, and a chute leading from the discharging position of said hopper to a bagging zone.

4. In a bagging machine, the combination comprising, a frame, a runway formed in the frame adjacent the top thereof, a carriage demountably supported in said runway, said carriage being slidable in said runway, a feed hopper having an open bottom demountably supported on said carriage and being movable therewith, a bottom panel demountably supported in said carriage and being slidable therein with respect to said carriage and hopper, said panel being adapted to register with the open bottom of said hopper, means on the frame engageable with said panel to limit the range of movement of the latter, and a chute leading from within the range of movement of said carriage and outside the range of movement of said panel to a bagging zone.

5. In a bagging machine, the combination comprising, a frame, a runway formed on the frame, a roller carriage demountably supported in and movable in said runway, said carriage having side members and a central open space, a feed hopper having an open bottom demountably supported on and movable with said carriage, the open bottom of said hopper being in register with said open space in said carriage, the side members of said carriage having grooves extending in the direction of movement of the carriage, a bottom panel demountably supported in said grooves, said panel being movable in said grooves and adapted to register with the open bottom of said hopper, means on the frame engageable with said panel to limit the range of movement of the latter, and a chute leading from within the range of movement of said carriage and outside the range of movement of said panel to a bagging zone.

6. In a bagging machine, the combination comprising, a frame, an inclined runway on said frame, a roller carriage demountably supported in said runway, said carriage having side members and a central open space, a feed hopper having an open bottom demountably supported by said carriage and movable therewith, the open bottom of said hopper being in register with said open space in said carriage, the side members of said carriage having grooves extending in the line of movement of said carriage, a bottom panel demountably supported in said grooves and slidable therein, said carriage and hopper being movable to a loading position at the lower end of said runway, said panel being adapted to register with the open bottom of said hopper when the latter is in loading position, said carriage and hopper being movable to a discharging position at the upper end of the runway, means on the frame limiting the movement of said panel when said carriage and hopper are moved to said discharging position whereby the bottom of said hopper is open when in said discharging position, and a chute leading from said discharging position to a bagging zone.

7. In a bagging machine, a frame, a feed hopper having an open bottom movably mounted on the frame, a panel forming the bottom of said hopper, said bottom panel being movable with respect to said hopper, a container mounted on said hopper, bearing balls in said container and engageable with said bottom panel, spring means biasing said bearing balls toward said bottom panel, said bearing balls tending to cause movement of said bottom panel with said hopper, and means mounted on the frame limiting movement of said bottom panel in one direction upon movement of said hopper.

8. In a bagging machine, a frame, a feed hopper mounted on the frame, said hopper being movable to a loading position and to a discharging position, said hopper diverging upwardly, and an angle member having legs of unequal lengths, said angle member being demountably secured on said hopper and adapted to be alternately disposed with either leg extending horizontally over the top of the hopper and inwardly from one side.

9. In a bagging machine, a frame, a feed hopper mounted on the frame, said hopper being movable to a loading position and to a discharging position, said hopper diverging upwardly, a chute leading from said discharging position and a bar mounted on the frame adjacent said chute, said bar being horizontally disposed and positioned above and closely adjacent the path of movement of said hopper, and an angle member having legs of unequal lengths, said angle member being demountably secured to said hopper on the side remote from said bar, said angle member adapted to be alternately disposed with either leg extending horizontally over the top of the hopper.

10. In a bagging machine, a frame having an inclined runway, a feed hopper slidably mounted on said runway and movable by gravity to a loading position at the lower end of said runway, and movable to a discharging position at the upper end of said runway, a horizontally disposed base member below the inclined runway, cam means mounted on said base member for moving said hopper rapidly from loading position to a point adjacent discharging position and thereafter slowly moving said hopper into discharging position, and means for actuating said cam means.

11. In a bagging machine, a frame, a feed hopper mounted on the frame and movable from a loading position to a discharging position, said hopper having an open bottom and a bottom panel, said bottom panel being movable, relative to said hopper, to a position whereby the bottom of said hopper is open when in discharging position, said hopper having a plurality of compartments extending in the direction of movement of the hopper, and a plurality of chutes individual to said compartments leading from said discharging position to a bagging zone.

12. In a machine of the character described, a frame, a hopper mounted on the frame and movable to a loading position and to a discharging position, said hopper having an open bottom, a bottom panel mounted on and movable with respect to said hopper, means for moving said hopper from said loading position to a point adjacent said discharging position, said bottom panel closing said open bottom, in all positions between said loading position and said point, said means being operable to move said hopper beyond said point into discharging position, and means for restricting movement of said bottom panel beyond said point as said hopper is moved therebeyond into said discharging position.

13. In a machine of the character described, the combination comprising, a frame having a top plate member, spaced channel members secured to the under surface of said plate member, a removable plate demountably supported by said channel members and forming a top duct with said plate member, a blower mounted in the frame having an outlet duct demountably extending into said top duct at one end thereof, a front plate demountably supported on the frame adjacent the other end of said top duct, a cover plate demountably supported on the frame and forming with said front plate a downwardly opening delivery duct, said delivery duct communicating with said top duct, means for supporting bags below the lower end of said delivery duct, a hopper supported above the frame for containing articles to be bagged, and chutes formed on said cover plate for receiving articles from said hopper and delivering them to said bags.

14. In a bagging machine, a magazine having a front wall disposed toward vertical, said magazine having a bottom curved about an axis parallel with said front wall and disposed above the bottom, partitions in said magazine disposed in planes transverse to said axis and dividing said magazine into compartments, a weighted pusher in each compartment pivoted adjacent said axis and swingable in the respective compartment, the bottom edge of said front wall terminating above the bottom of said magazine forming an opening individual to each compartment, a holding clip adjacent each lower corner of the opening of each compartment and extending in front of and in overlapping relation to the opening, a chute terminating adjacent the upper edge of each opening on the outer side of said front wall, and means for feeding articles to be bagged into said chutes.

15. In a bagging machine, a magazine having a front wall disposed toward vertical, said magazine having a bottom curved about an axis parallel with said front wall and disposed above the bottom, partitions in said magazine disposed in planes transverse to said axis and dividing said magazine into compartments, a weighted pusher in each compartment pivoted adjacent said axis and swingable in the respective compartment, the bottom edge of said front wall terminating above the bottom of said magazine forming an opening individual to each compartment, said front wall having a projection extending downwardly in front of and in overlapping relation to each opening, said pusher being adapted to engage said projection, a holding clip adjacent each lower corner of the opening of each compartment and extending in front of and in overlapping relation to the opening, a chute terminating adjacent the upper edge of each opening on the outer side of said front wall, and means for feeding articles to be bagged into said chutes.

16. In a bagging machine of the character described, a magazine having a wall disposed toward vertical, said wall having an opening therein, a movable pusher plate in the magazine, means for urging said plate toward said opening, said plate being adapted to bear against a portion of said wall defining the upper edge of said opening, a holding clip at each lower corner of said opening and extending in front of and in overlapping relation to said opening, said clips having cooperating surfaces diverging from the plane of said opening, a chute terminating adjacent the top of said opening, and means for feeding articles into said chute.

17. In a bagging machine of the character described, a magazine having a wall disposed toward vertical, and a bottom portion, a plurality of partitions disposed perpendicular to said wall forming compartments, said bottom portion having extensions disposed under and terminating in register with said partitions, said wall having openings individual to said compartments, a movable pusher plate in each compartment, means for moving each pusher plate toward the respective opening, a holding clip at each lower corner of each opening, each holding clip including a clip plate secured transversely to the outer edge of the respective partition, and a plane-surface filler piece secured between the clip plate and the partition, each extension on said bottom portion having a greater transverse dimension than the adjacent filler piece, and each clip plate having a greater transverse dimension than said extension, a chute terminating adjacent the top of each opening, and means for feeding articles into said chutes.

18. In a bagging machine of the character described, a magazine having a wall disposed toward vertical, a plurality of partitions disposed perpendicular to said wall forming compartments, said wall having openings individual to said compartments, a movable pusher plate in each compartment, means for moving each pusher plate toward the respective opening, a holding clip at each lower corner of each opening, each holding clip including a clip plate secured transversely to the outer edge of the respective partition, and a plane-surface filler piece secured between the clip plate and the partition, a chute terminating adjacent the top of each opening, and means for feeding articles into said chutes.

19. In a bagging machine of the character described, a magazine having a wall disposed toward vertical, a plurality of partitions disposed perpendicuar to said wall forming compartments, said wall having openings individual to said compartments, a movable pusher plate in each compartment, means for moving each pusher plate toward the respective opening, a holding clip at each lower corner of each opening, each holding clip including a clip plate secured transversely to the outer edge of the respective partition, and a plane-surface filler piece secured between the clip plate and the partition, a chute terminating adjacent the top of each opening, and means for feeding articles into said chutes, the greatest transverse dimension of said filler plate being less than the transverse dimension of said clip plate.

20. In a machine of the character described, a magazine having a wall disposed toward vertical, said wall having an opening individual to each of a plurality of compartments adjacent the bottom of the wall, a plurality of partitions in the magazine perpendicular to said wall forming said compartments, a notch in each partition adjacent the top thereof and adjacent said wall, a shaft demountably supported in said notches and extending transversely across the magazine, a weighted pusher demountably and pivotally supported on said shaft in each compartment, a plate secured to each pusher, said pushers being swingable in said compartments and the plates thereon movable toward the respective opening, a chute terminating adjacent the top of each opening, and means for feeding articles into said chutes.

21. In a bagging machine of the character described, the combination comprising, a frame, magazine demountably supported in the frame, and having an open side at the forward end thereof, a wall plate demountably supported on said magazine and covering a portion of said open side, the lower edge of said wall plate terminating above the bottom of said magazine and forming a feed opening, a plurality of partitions in said magazine perpendicular to said wall plate forming compartments, a notch in each partition adjacent the top thereof and adjacent said wall plate, a shaft demountably supported in said notches and extending transversely across the magazine, a weighted pusher in each compartment demountably and pivotally supported on said shaft, a plate on each pusher, each pusher being swingable in its compartment and the plate thereon movable toward said feed opening, and an outer plate demountably supported outwardly of said wall plate, said outer plate having chutes formed therein individual to said compartments and terminating adjacent the upper edge of said magazine, and means for feeding articles into said chutes.

22. In a bagging machine, a generally closed frame, a feed hopper mounted on the upper part of the frame and movable to a loading position, and to a discharging position at one side of the frame, a plate pivoted in the frame below said discharging position, said plate being normally horizontal and swingable upwardly, a magazine removably mounted on said plate, said plate being adapted to deflect articles descending from said feed hopper in discharging position, operating means mounted in said frame below said plate and exposed to the exterior when said plate is pivoted upwardly, and means operably interconnecting said operating means and said feed hopper, said operating means being effective for moving said feed hopper from loading position to discharging position.

KENNETH A. BEVINGTON.

References Cited in the file of this patent

UNITED STATES PATENTS

| Number | Name | Date |
|---|---|---|
| 1,874,669 | Wagner | Aug. 30, 1932 |
| 2,008,896 | Brown | July 23, 1935 |
| 2,020,415 | Hirsch | Nov. 12, 1935 |
| 2,021,322 | Newberry | Nov. 19, 1935 |
| 2,211,061 | Hawley | Aug. 13, 1940 |
| 2,246,196 | Van Voorhis | June 17, 1941 |
| 2,336,213 | Bayer et al. | Dec. 7, 1943 |
| 2,355,500 | Anderson | Aug. 8, 1944 |
| 2,372,647 | Beane | Apr. 3, 1945 |
| 2,375,065 | Askue | May 1, 1945 |
| 2,388,987 | Morrison | Nov. 13, 1945 |
| 2,424,252 | Orlando | July 22, 1947 |
| 2,509,320 | Smith et al. | May 30, 1950 |

FOREIGN PATENTS

| Number | Country | Date |
|---|---|---|
| 333,530 | Great Britain | Aug. 13, 1930 |
| 542,930 | Germany | Jan. 30, 1932 |